US009886884B2

(12) United States Patent
Zhou et al.

(10) Patent No.: US 9,886,884 B2
(45) Date of Patent: Feb. 6, 2018

(54) PIXEL ARRANGING METHOD, PIXEL RENDERING METHOD AND IMAGE DISPLAY DEVICE

(71) Applicant: Boe Technology Group Co., Ltd., Beijing (CN)

(72) Inventors: Li Zhou, Beijing (CN); Chungchun Lee, Beijing (CN); Yangfeng Wang, Beijing (CN); Feng Jiang, Beijing (CN); Long Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/320,421

(22) PCT Filed: Jul. 20, 2015

(86) PCT No.: PCT/CN2015/084418
§ 371 (c)(1),
(2) Date: Dec. 20, 2016

(87) PCT Pub. No.: WO2016/150041
PCT Pub. Date: Sep. 29, 2016

(65) Prior Publication Data
US 2017/0256193 A1 Sep. 7, 2017

(30) Foreign Application Priority Data
Mar. 23, 2015 (CN) .......................... 2015 1 0126759

(51) Int. Cl.
*G09G 3/20* (2006.01)
*G09G 5/02* (2006.01)
(Continued)

(52) U.S. Cl.
CPC ... *G09G 3/2003* (2013.01); *G09G 2300/0443* (2013.01); *G09G 2300/0452* (2013.01); *G09G 2330/021* (2013.01)

(58) Field of Classification Search
CPC combination set(s) only.
See application file for complete search history.

(56) References Cited

U.S. PATENT DOCUMENTS 8,018,476 B2 9/2011 Credelle et al.
8,134,583 B2 3/2012 Credelle
(Continued)

FOREIGN PATENT DOCUMENTS

CN 101336443 12/2008
CN 102339587 2/2012
(Continued)

OTHER PUBLICATIONS

Office action from Chinese Application No. 201510126759.9 dated Mar. 9, 2017.
(Continued)

*Primary Examiner* — Wesner Sajous
(74) *Attorney, Agent, or Firm* — Calfee, Halter & Griswold LLP

(57) ABSTRACT

The present disclosure relates to a pixel arranging method. A repeating unit consists of a first structural unit and a second structural unit that are repeatedly arranged in the horizontal direction respectively, and are alternately arranged in the vertical direction; the first structural unit and the second structural unit respectively comprises seven sub-pixels, the seven sub pixels includes two sub-pixels of a first color, two sub-pixels of a second color, two sub-pixels of a third color and one sub-pixel of a fourth color; or two sub-pixels of the first color, one sub-pixel of the second color, two sub-pixels of the third color and two sub-pixels of
(Continued)

Flow of a method for calculating the pixel structural arrangement R2G2B2W the fourth color. The present disclosure also relates to a sub-pixel rendering method and an image display device. In case of limited manufacturing processes, the resolution can still be increased, while power consumption can be lowered.

6 Claims, 5 Drawing Sheets

(51) Int. Cl.

| | |
|---|---|
| ***G09G 5/06*** | (2006.01) |
| ***H04N 1/60*** | (2006.01) |
| ***H04N 5/202*** | (2006.01) |
| ***H04N 9/73*** | (2006.01) |

(56) References Cited

U.S. PATENT DOCUMENTS

| | | | | |
|---|---|---|---|---|
| 2003/0128225 | A1 | 7/2003 | Credelle et al. | |
| 2004/0008049 | A1 | 1/2004 | Figueras et al. | |
| 2007/0057963 | A1* | 3/2007 | Brown Elliott ... | G02F 1/133514 345/613 |
| 2009/0015770 | A1 | 1/2009 | Ito et al. | |
| 2009/0102769 | A1* | 4/2009 | Kouno ................. | G09G 3/3648 345/88 |
| 2010/0265272 | A1 | 10/2010 | Bae et al. | |
| 2016/0005381 | A1* | 1/2016 | Yata ..................... | G09G 3/2074 345/690 |

FOREIGN PATENT DOCUMENTS

| | | |
|---|---|---|
| CN | 102636894 | 8/2012 |
| CN | 203054413 | 7/2013 |
| CN | 103529586 | 1/2014 |
| CN | 103632618 | 3/2014 |
| CN | 104157231 | 11/2014 |
| CN | 104217670 | 12/2014 |
| CN | 104238221 | 12/2014 |
| CN | 104269149 | 1/2015 |
| CN | 104680945 | 6/2015 |
| EP | 2487528 | 8/2012 |
| JP | 5236422 | 4/2010 |
| TW | 200712623 | 4/2007 |

OTHER PUBLICATIONS

International Search Report for PCT/CN2015/084418 dated Dec. 31, 2015.

Office Action from China Application No. 201510126759.9 dated Sep. 28, 2016.

Third Office action from Chinese Application No. 201510126759.9 dated Jul. 18, 2017.

Fourth Office action from Chinese Application No. 201510126759.9 dated Nov. 28, 2017.

* cited by examiner

| | | | | | | |
|---|---|---|---|---|---|---|
| R | G | B | G | R | W | B |
| B | W | R | G | B | G | R |
| R | G | B | G | R | W | B |
| B | G | R | W | B | G | R |

(A) RGBG RWB + BGRW BGR

| | | | | | | |
|---|---|---|---|---|---|---|
| R | G | B | G | R | W | B |
| G | B | W | R | B | G | R |
| R | G | B | G | R | W | B |
| G | B | W | R | B | G | R |

(B) RGBG RWB + GBWR BGR

| | | | | | | |
|---|---|---|---|---|---|---|
| R | G | B | W | R | G | B |
| R | G | B | W | R | G | B |
| R | G | B | W | R | G | B |
| R | G | B | W | R | G | B |

(C) RGB W RGB + RGB W RGB

| | | | | | | |
|---|---|---|---|---|---|---|
| R | G | B | G | R | W | B |
| B | G | R | W | B | G | R |
| R | G | B | G | R | W | B |
| B | G | R | W | B | G | R |

(D) RGB W RGB + BGR W BGR

Pixel Structural Arrangement R2G2B2W

Schematic view of a method for calculating
the pixel structural arrangement R2G2B2W Flow of a method for calculating the pixel structural arrangement R2G2B2W (A) RWBG RWB + BWRG BWR (B) RWBG RWB + RWBG RWB Pixel Structural Arrangement R2G1B2W2

Schematic view of a method for calculating the pixel structural arrangement R2GB2W2

Flow of a method for calculating the pixel structural arrangement R2GB2W2

| | | | | | | |
|---|---|---|---|---|---|---|
| R | G | B | G | R | W | B |
| B | W | R | W | B | G | R |
| R | G | B | G | R | W | B |
| B | W | R | W | B | G | R |

(A) RGBG RWB + BWRW BGR

| | | | | | | |
|---|---|---|---|---|---|---|
| R | G | B | G | R | W | B |
| W | B | W | R | B | G | R |
| R | G | B | G | R | W | B |
| W | B | W | R | B | G | R |

(B) RGBG RWB +WBWR BGR

| | | | | | | |
|---|---|---|---|---|---|---|
| R | G | B | G | R | W | B |
| R | W | B | W | R | G | B |
| R | G | B | G | R | W | B |
| R | W | B | W | R | G | B |

(C) RGBG RWB + RWBW RGB

| | | | | | | |
|---|---|---|---|---|---|---|
| R | G | B | W | R | G | B |
| B | W | R | G | B | W | R |
| R | G | B | W | R | G | B |
| B | W | R | G | B | W | R |

(D) RGBW RGB + BWRG BWG

Pixel Arrangement Structure R2G2B2W+R2G1B2W2

Fig.7

(A) $RG_{1/2}BG_{1/2}$ RWB + $BW_{1/2}RW_{1/2}$ BGR　(B) $RG_{1/2}BG_{1/2}$ RWB + $W_{1/2}BW_{1/2}R$ BGR (C) $RG_{1/2}G_{1/2}B$ RWB + B $W_{1/2}W_{1/2}R$ BGR　(D) $RG_{1/2}$ $G_{1/2}B$ RWB + $W_{1/2}W_{1/2}BR$ BGR (E) $RG_{1/2}BG_{1/2}$ $RW_{1/2}B$ + $BW_{1/2}RW_{1/2}$ $BG_{1/2}R$　(F) $RG_{1/2}BG_{1/2}$ $RW_{1/2}B$ + $W_{1/2}BW_{1/2}R$ $BG_{1/2}R$

Pixel Arrangement Structure $R2G_{1/2}$ 2B2W + $R2G1B2W_{1/2}$ 2

PIXEL ARRANGING METHOD, PIXEL RENDERING METHOD AND IMAGE DISPLAY DEVICE

RELATED APPLICATIONS

The present application is the U.S. national phase entry of PCT/CN2015/084418 with an International filing date of Jul. 20, 2015, which claims the benefit of Chinese Application No. 201510126759.9, filed on Mar. 23, 2015, the entire disclosures of which are incorporated herein by reference.

TECHNICAL FIELD

The present disclosure relates to the field of display technology, and more particularly to a display technology concerning various packed-pixel arranging manners and sub-pixel rendering.

BACKGROUND ART

Along with continuous improvement of the performance of display devices, high-resolution display screens have been applied to a variety of consumer electronics, with display resolution keeping rising. The power consumption of the high-resolution display device, however, gets higher as the resolution thereof ascends, so a high-resolution display device with low power consumption is currently a technical bottleneck. And with green activities prevailing around the world, people are setting higher requirements for low-power display products, so the current high-resolution high-power display products do not meet the needs of the marketplace.

In a high-resolution panel design, the density of sub-pixels becomes higher and higher, which leads to a sharp declination of the aperture ratio of sub-pixels. White sub-pixels are used to improve the transmittance of the panel, but the excessive number of white pixels may lead to colour difference and thereby influence the image display quality.

SUMMARY

To this end, the present disclosure, starting from the pixel structural arrangement, designs a new pixel arranging method that can raise the pixel density and meanwhile reduce the power consumption, and that can, in conjunction with corresponding algorithm arrangements and colour film processes, achieve high colour gamut and low-power display, thereby appropriately reducing or eliminating at least one of the above-mentioned technical problems.

The present disclosure provides a low-power, high-resolution pixel arranging manner and sub-pixel rendering method to for example, represent three pixels and/or two pixels by using two red sub-pixels, two or one green sub-pixel, two blue sub-pixels, one or two white sub-pixels in an arranging manner of e.g., R2G2B2W (such as, RG BG RWB, GB WR BGR) or R2G1B2W2 (such as, RWBG RWB), in conjunction with a sub-pixel rendering technology. In case of limited manufacturing processes, the resolution can still be increased, while power consumption can be lowered.

According to one aspect, there is provided a pixel arranging method, comprising: constituting a repeating unit from a first structural unit and a second structural unit that are repeatedly arranged in the horizontal direction respectively, and are alternately arranged in the vertical direction; the first structural unit and the second structural unit respectively comprising seven sub-pixels, the seven sub pixels including two sub-pixels of a first color, two sub-pixels of a second color, two sub-pixels of a third color and one sub-pixel of a fourth color; or two sub-pixels of the first color, one sub-pixel of the second color, two sub-pixels of the third color and two sub-pixels of the fourth color. According to this embodiment, the resolution can be improved, and meanwhile power consumption can be reduced in case of limited manufacturing processes.

Optionally, the sub-pixel of the first color is a red sub-pixel R, the sub-pixel of the second color is a green sub-pixel G, the sub-pixel of the third color is a blue sub-pixel B, and the sub-pixel of the fourth color is a white sub-pixel W.

Optionally, each pixel of the first structural unit and the second structural unit borrows the missing color sub-pixel from a surrounding pixel, and the sub-pixel of the fourth color is shared by three pixels constituting the first structural unit or the second structural unit. According to this embodiment, the transmittance of the display can be improved so as to better restore an image.

Optionally, the pixels of the first structural unit and the second structural unit are respectively composed of two sub-pixels of the first color, two sub-pixels of the second color, two sub-pixels of the third color and one sub-pixel of the fourth color. According to this embodiment, the image resolution can be improved, and meanwhile power consumption can be reduced for better image quality.

Optionally, the pixel structural arrangement of the repeating unit consisting of the first structural unit and the second structural unit are RGBG RWB+BGRW BGR, wherein the three pixels of the first structural unit are RG, BG and RWB, and the three pixels of the second structural unit are BG, RWB and GR. According to this embodiment, the display effect can be finely adjusted as actually required.

Optionally, the pixel structural arrangement of the repeating unit consisting of the first structural unit and the second structural unit are RGBG RWB+GBWR BGR, wherein the three pixels of the first structural unit are RG, BG and RWB, and the three pixels of the second structural unit are GB, WRB and GR. According to this embodiment, it can avoid jagged distortion of a high-resolution image, and reproduce color more accurately and provide a more uniform image.

Optionally, the pixel structural arrangement of the repeating unit consisting of the first structural unit and the second structural unit are RG BWR GB+RG BWR GB, wherein the first structural unit and the second structural unit respectively comprise three pixels RG, BWR and GB, or each comprises two RGB pixels. According to this embodiment, the display effect can be finely adjusted as actually required.

Optionally, the pixel structural arrangement of the repeating unit consisting of the first structural unit and the second structural unit are RG BWR GB+BG RWB GR, wherein the three pixels of the first structural unit are RG, BWR and GB, and the three pixels of the second structural unit are BG, RWB and GR; or the first structural unit comprises two RGB pixels and the second structural unit comprises two BGR pixels. According to this embodiment, the display effect can be finely adjusted as actually required.

Optionally, the pixels of the first structural unit and the second structural unit are respectively composed of two sub-pixels of the first color, one sub-pixel of the second color, two sub-pixels of the third color and two sub-pixels of the fourth color. According to this embodiment, the image resolution can be improved, and meanwhile power consumption can be reduced; better compatibility with current processes and simple algorithm can be achieved.

Optionally, the pixel structural arrangement of the repeating unit consisting of the first structural unit and the second structural unit are RWBG RWB+BWRG BWR, wherein the three pixels of the first structural unit are RW, BG and RWB, and the three pixels of the second structural unit are BW, RG and BWR; or the first structural unit and the second structural unit are expressed as two pixels comprising RGB sub-pixels as much as possible, and if not, missing pixels can be borrowed from surrounding pixels.

Optionally, the pixel structural arrangement of the repeating unit consisting of the first structural unit and the second structural unit are RWBG RWB+RWBG RWB, wherein the three pixels of the first structural unit are RW, BG and RWB, and the three pixels of the second structural unit are RW, BG and RWB.

Optionally, the pixel structural arrangement of the repeating unit consisting of the first structural unit and the second structural unit can be selected from the group consisting of RGBW RWB+RGBW RWB, RWBW RGB+RWBW RGB, RGBW RWB+BGRW BWR, RWBW RGB+BWRW BGR, RGBW RWB+RWBG RWB, RGBW RWB+RWBG RWB.

Optionally, the red sub-pixel R and the blue sub-pixel B are interchangeable in position, and the green sub-pixel G and the white sub-pixel W are interchangeable in position.

According to the above embodiment, the display effect can be finely adjusted as actually required.

Optionally, the pixels of the first structural unit are composed of two sub-pixels of the first color, two sub-pixels of the second color, two sub-pixels of the third color and one sub-pixel of the fourth color; and the pixels of the second structural unit are composed of two sub-pixels of the first color, one sub-pixel of the second color, two sub-pixels of the third color and two sub-pixel of the fourth color. According to this embodiment, the image resolution can be improved, and meanwhile power consumption can be reduced; optimal image quality and better image color balance can be achieved.

Optionally, the pixel structural arrangement of the repeating unit consisting of the first structural unit and the second structural unit can be selected from the group consisting of RGBG RWB+BWRW BGR, RGBG RWB+WB WR BGR, RGBG RWB+RWBW RGB, RGBW RGB+BWRG BWR. According to this embodiment, the display effect can be finely adjusted.

Optionally, if the number of G sub-pixels or W sub-pixels of the repeating unit is 2, the respective area of G and W sub-pixels can be ½ of the area of any other sub-pixel. According to this embodiment, the problem of over-high luminance of white sub-pixels can be solved.

Optionally, the pixel structural arrangement of the repeating unit consisting of the first structural unit and the second structural unit is $RG_{1/2}BG_{1/2}$ $RWB+BW_{1/2}RW_{1/2}$ BGR, wherein $W_{1/2}$ and $G_{1/2}$ respectively represent a white sub-pixel and a green sub-pixel whose area is ½ of that of any other sub-pixel. According to this embodiment, the display effect can be finely adjusted.

Optionally, the pixel structural arrangement of the repeating unit consisting of the first structural unit and the second structural unit is $RG_{1/2}BG_{1/2}$ $RWB+W_{1/2}BW_{1/2}R$ BGR. According to this embodiment, it can avoid jagged distortion, and reproduce color more accurately and provide a more uniform image.

Optionally, the pixel structural arrangement of the repeating unit consisting of the first structural unit and the second structural unit can be selected from the group consisting of $RG_{1/2}G_{1/2}B$ $RWB+BW_{1/2}W_{1/2}R$ BGR, $RG_{1/2}G_{1/2}B$ RWB $W_{1/2}W_{1/2}BR$ BGR.

Optionally, the pixel structural arrangement of the repeating unit consisting of the first structural unit and the second structural unit can also be selected from the group consisting of $RG_{1/2}BG_{1/2}$ $RW_{1/2}B+BW_{1/2}RW_{1/2}$ $RG_{1/2}BG_{1/2}$ $RW_{1/2}B+W_{1/2}BW_{1/2}R$.

Optionally, the first structural unit and the second structural unit can also be expressed as two pixels comprising RGB sub-pixels as much as possible, and if not, missing sub-pixels can be borrowed from surrounding pixels.

Optionally, under the circumstances that the sub-pixels of the same color of the neighboring pixels among the pixels constituting the first structural unit and the second structural unit are guaranteed against adjacency to each other, sub-pixels included in each pixel are interchangeable in position.

According to this embodiment, the display effect can be finely adjusted.

Optionally, a wide color gamut photoluminescent color film material, such as quantum dots, can be used to solve the problem of color difference resulting from addition of white sub-pixels.

Optionally, a W sub-pixel in all the pixel arrangement structures can be replaced by a yellow sub-pixel Y, a cyan sub-pixel C, or a magenta sub-pixel M in order to achieve a richer display effect.

According to another aspect, there is provided a sub-pixel rendering method, comprising the steps of:

a. extracting a sub-pixel W' from three input original pixels $(RGB)_3$, wherein $W'=f(Y_{1min}, Y_{1max}, Y_{2min}, Y_{2max}, Y_{3min}, Y_{3max})$, $Y_{1min}$ and $Y_{1max}$ respectively denote the minimum value and maximum value of luminance of $R_1G_1B_1$, $Y_{2min}$ and $Y_{2max}$ respectively denote the minimum value and maximum value of luminance of $R_2G_2B_2$, and $Y_{3min}$ and $Y_{3max}$ respectively denote the minimum value and maximum value of luminance of $R_3G_3B_3$.

b. removing the sub-pixel W' from the original pixel $R_i$ $G_i$ $B_i$ (i=1, 2, 3) to obtain $R_i^*$ $G_i^*$ $B_i^*$(i=1, 2, 3);

c. calculating sub-pixels $R_1'$ and $R_2'$ by using $R_1^*$, $R_2^*$, $R_3^*$ in $(R_i^*G_i^*B_i^*)_{1=1,2,3}$, calculating sub-pixels $G_1'$ and $G_2'$ by using $G_1^*$, $G_2^*$, $G_3^*$, and calculating sub-pixels $B_1'$ and $B_2'$ by using $B_1^*$, $B_2^*$, $B_3^*$, wherein $$R_1'=g_1(R_1^*,R_2^*),R_2'=g_2(R_2^*,R_3^*);$$

$$G_1'=g_1(G_1^*,G_2^*),G_2'=g_2(G_2^*,G_3^*);$$

$$B_1'=g_1(B_1^*,B_2^*),B_2'=g_2(B_2^*,B_3^*).$$

According to a further aspect, there is provided a sub-pixel rendering method, comprising the steps of:

a. extracting sub-pixels $W_1'$ and $W_2'$ from three input original pixels $(RGB)_3$, wherein $W_1'=g_1(W_1, W_2)$; $W_2'=g_2(W_2, W_3)$; and wherein $W_i=f(Y_{i\ min}, Y_{i\ max})$, $Y_{1min}$ and $Y_{1max}$ respectively denote the minimum value and maximum value of luminance of $R_1G_1B_1$, $Y_{2min}$ and $Y_{2max}$ respectively denote the minimum value and maximum value of luminance of $R_2G_2B_2$, and $Y_{3min}$ and $Y_{3max}$ respectively denote the minimum value and maximum value of luminance of $R_3G_3B_3$.

b. removing the sub-pixel W' from the original pixel $R_i$ $G_i$ $B_i$ (i=1, 2, 3) to obtain $R_i^*$ $G_i^*$ $B_i^*$(i=1, 2, 3);

c. calculating sub-pixels $R_1'$ and $R_2'$ by using $R_1^*$, $R_2^*$, $R_3^*$ in $(R_i^*G_i^*B_i^*)_{i=1,2,3}$, calculating a sub-pixel $G_1'$ by using $G_1^*$, $G_2^*$, $G_3^*$, and calculating sub-pixels $B_1'$ and $B_2'$ by using $B_1^*$, $B_2^*$, $B_3^*$, wherein $$R_1'=g_i(R_1^*,R_2^*),R_2'=g_2(R_2^*,R_3^*);$$

$$G_1'=g(G_1^*,G_2^*,G3^*);$$

$$B_1'=g_1(B_1^*,B_2^*),B_2'=g_2(B_2^*,B_3^*).$$

Optionally, the sub-pixels $R_1'$, $R_2'$, $G_1'$, $G_2'$, $B_1'$, $B_2'$ can be determined in conjunction with the luminance $R_i$、$G_i$、$B_i$ and size $S_{Ri}$, $S_{Gi}$, $S_{Bi}$ (i=1, 2, 3) of the original pixels, and the area $S_{Ri}'$, $S_{Gi}'$, $S_{Bi}'$ (i=1, 2) of the converted pixels, to ensure $\Sigma R_i*S_{Ri}=\Sigma R_i'*S_{Ri}'$, $\Sigma G_i*S_{Gi}=\Sigma G_i'*S_{Gi}'$, $\Sigma B_i*S_{Bi}=\Sigma B_i'*S_{Bi}'$, and the functions are corrected according to the expressed color difference.

According to the above embodiment, the image resolution can be improved, and meanwhile power consumption can be reduced and optimal display effect can be achieved.

According to another aspect, there is provided an image display device, the pixels of which are arranged according to the pixel structural arrangement of any repeating unit included in the embodiments of the present application.

The embodiments of the present disclosure are mainly used for high-resolution display devices.

The embodiments of the present disclosure provide optimal designs of sub-pixel size, arrangement and pixel distribution in combination of the advantages of pixel arrangements RGBG RWB and RGBW RGB and according to the optimal color and gamut matching, so as to significantly reduce the power consumption and improve the color gamut, and lessen the process pressure.

BRIEF DESCRIPTION OF DRAWINGS

Exemplary embodiments of the present disclosure will be described with reference to the drawings to render the features and advantages of the embodiments apparent, wherein:

FIGS. 1(A)-1(D) are schematic views showing a pixel structural arrangement R2G2B2W according to an embodiment;

FIGS. 7(A)-7(D) are schematic views showing a pixel structural arrangement R2G2B2W+R2G1B2W2 according to an embodiment.

DETAILED DESCRIPTION

Figures 1, 2:
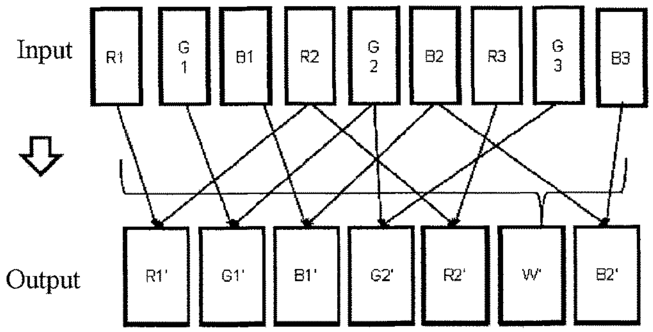
FIG. 2 is a schematic view showing a method for calculating the pixel structural arrangement R2G2B2W according to an embodiment.

The embodiments of the disclosure will be described in more detail with reference to the drawings. Nevertheless, as far as those skilled in the art are concerned, the present invention can be embodied in a variety of forms and should not be interpreted as being limited to the embodiments and specific details mentioned herein. Throughout the description, the same reference numerals refer to the same elements.

A pixel, known as a pel, is a basic unit of a displayed image. Each pixel on a typical LCD panel consists of primary colors, namely red, blue, green (RGB), and each color of each pixel is usually called a "sub-pixel". A display panel is composed of numerous pixels, but each individual pixel needs to be divided into three sub-pixels, e.g., red, green and blue sub-pixels, that are at a level lower than the pixels so as to enable each pixel to display a variety of colors. That is, for example, three sub-pixels constitute a whole, i.e., a color pixel. When different colors need to be displayed, the three sub-pixels respectively emit lights at different luminances. Due to the very small size of a sub-pixel, a desired color will be visually created by mixing. Some pixel arrangement structures will be elaborated by means of the following embodiments.

In the embodiments of the present disclosure, the pixel arrangement structures thereof are all described by taking three subpixels, namely red, green and blue sub-pixels (R, G, B), as an example. In all the pixel arrangement structures according to the embodiments of the present disclosure, alternatively, those skilled in the art can conceive of replacing sub-pixels in the colors of R, G, B, W disclosed herein by combinations of sub-pixels in other colors. For instance, the sub-pixel W can be replaced by a yellow sub-pixel Y, a cyan sub-pixel C, or a magenta sub-pixel M.

FIGS. 1(A)-1(D) are schematic views showing a pixel structural arrangement R2G2B2W according to an embodiment. "R2G2B2W" refers to a pixel structural arrangement composed of seven sub-pixels, namely two red sub-pixels, two green sub-pixels, two blue sub-pixels and one white sub-pixel. In this embodiment, as shown in FIG. 1(A), the pixel structural arrangement is RGBG RWB+BGRW BGR, which means that a structural unit RGBG RWB and another structural unit BGRW BGR are combined to form a repeating structural unit, wherein the symbol "+" means the combination of two arrangement structures. RG, BG, RWB, BG, RWB and GR respectively represent one pixel, that is, R2B2G2W represent three pixels altogether.

In regard to the above structure, the pixel rendering calculation method of the RGBG RWB structure can comprise the steps that a pixel RG borrows a sub-pixel B from surrounding pixels (such as, pixel BG), the pixel BG borrows a sub-pixel R from the pixel RG, and a pixel RWB borrows a sub-pixel G from the surrounding pixels (such as, pixels RG and BG). BG, RWB and GR in the pixel structural arrangement BGRW BGR respectively represent three pixels that borrow missing sub-pixels from one another, wherein a white sub-pixel W is shared by the three sub-pixels; or the arrangement BGRW BGR can also be replaced by BWRG BGR that are represented by three pixels BWR, GB and GR, which are arranged as shown in the second row of FIG. 1(A).

Optionally, as shown in FIG. 1(B), the pixel arrangement structure is composed of a repeating unit RG BG RWB+GB WRB GR. Different from the embodiment as shown in FIG. 1(A), in order to avoid jagged distortion of a high-definition image, and reproduce color more accurately and provide a more uniform image, the sub-pixel G and the sub-pixel B as well as the sub-pixel W and the sub-pixel R in the embodiment of FIG. 1(A) are exchanged in position to achieve better image representation, wherein RG, BG and RWB are three pixel units that borrow missing sub-pixels from surrounding pixels, and GB, WRB and GR are three pixel units and the sub-pixel W is shared by the three pixel units.

Optionally, as shown in FIG. 1(C), the pixel arrangement structure is composed of a repeating unit RG BWR GB+RG BWR GB, wherein RG BWR GB are three pixel units that borrow sub-pixels from one another, and the sub-pixel W is shared by the three pixel. In addition, the pixel arrangement structure can also be expressed as merely two pixels, namely, two RGB repeating units of RGB W RGB represent two pixels respectively, and the sub-pixel W is shared by two pixels.

Optionally, the repeating unit of the pixel arrangement structure may be RGB W RGB+BGR W BGR, as shown in FIG. 1(D). The pixel arrangement structure is expressed in the same way as stated above, which will not be reiterated herein.

FIG. 2 is a schematic view showing a method for calculating the pixel structural arrangement R2G2B2W according to an embodiment. In regard to the above structure, the basic idea of the calculating method is to express three pixels by two red sub-pixels, two green sub-pixels, two blue sub-pixels and one white sub-pixel (namely, R2G2B2W1), wherein missing sub-pixel colors are borrowed from the surrounding pixels, and the sub-pixel W is shared by the three pixels to improve the transmittance of the three pixels.

As shown in FIG. 2, the input signals are three original pixels, namely $(RGB)_3$, the sub-pixel W' is extracted from the original three pixels, the sub-pixel W' and sub-pixel G together reflect a luminance channel. Meanwhile, two red, green and blue sub-pixels in the actual pixels are used to present a color channel.

Figure 3:
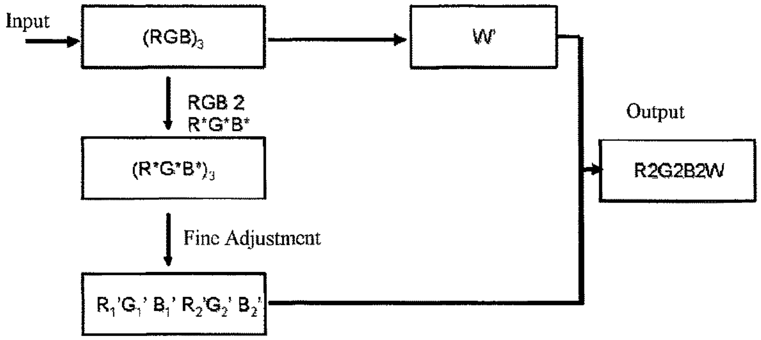
FIG. 3 is a flow block diagram of the method for calculating the pixel structural arrangement R2G2B2W according to an embodiment.

A flow diagram of the method for calculating the pixel structural arrangement R2G2B2W according to an embodiment is shown in FIG. 3:

1) determining the sub-pixel W', wherein $Y_{1min}$ denotes the minimum value of luminance of $R_1G_1B_1$, $V_{1max}$ denotes the maximum value of luminance of $R_1G_1B_1$, $Y_{2min}$ denotes the minimum value of luminance of $R_2G_2B_2$, $Y_{2max}$ denotes the maximum value of luminance of $R_2G_2B_2$, $Y_{3min}$ denotes the minimum value of luminance of $R_3G_3B_3$, and $Y_{3max}$ denotes the maximum value of luminance of $R_3G_3B_3$, $$W'f(Y_{1min}, Y_{1max}, Y_{2min}, Y_{2max}, Y_{3min}, Y_{3max}).$$

2) converting the original pixel $R_i$ $G_i$ $B_i$ (i=1, 2, 3) into $R_i$* $G_i$* $B_i$*(i=1, 2, 3);

$$R_i^*=R_i(1+\alpha_i)-W';$$

$$G_i^*=G_i(1+\alpha_i)-W';$$

$$B_i^*=B_i(1+\alpha_i)-W';$$

Wherein $\alpha_i$ can be optimally selected according to the pixel color space scaling up, for instance, $\alpha_i$ (i=1,2,3) can be determined by the following equation:

$$\alpha_i=Y_{i\,max}/Y_{i\,max}-Y_{i\,min})-1$$

Nevertheless, the ways to determine $\alpha_1$, $\alpha_2$ and $\alpha_3$ are not limited to the above-mentioned manner. There can also be other image quality improving manners to guarantee optimal luminance and color gamut after the pixel RGB is converted into the pixel RGB W, and meanwhile the following equation shall be satisfied:

$$R_i^*:G_i^*:B_i^*=(R_i+W'):(G_i+W'):(B_i+W').$$

3) in $(R_i^*G_i^*B_i^*)_{i=1,2,3}$, expressing $R_1$*, $R_2$*, $R_3$* by the subpixels $R_1$', $R_2$' in the following manner:

$$R_1'=g_1(R_1^*,R_2^*).$$

$$R_2'=g_2(R_2^*,R_3^*).$$

Similarly, $G_1$*, $G_2$*, $G_3$* can be expressed by the subpixels $G_1$', $G_2$' in the following manner:

$$G_1'=g_1(G_1^*,G_2^*).$$

$$G_2'=g_2(G_2^*,G_3^*).$$

Similarly, $B_1$*, $B_2$*, $B_3$* can be expressed by the subpixels $B_1$', $B_2$' in the following manner:

$$B_1'=g_1(B_1^*,B_2^*).$$

$$B_2'=g_2(B_2^*,B_3^*).$$

Wherein, f, g1, g2 functions perform a pixel binning by means of an average pixel assignment, maximum value, minimum value, linear function or non-linear function and the like. Optionally, in conjunction with the size of the blank region of the pixel and the size of the white sub-pixel, R1', G1', B1', R2', G2', B2' can be determined, and then be simulated and compared with the original data so as to select an optimal proportioning solution, thereby expressing three pixels by R2G2B2W.

Optionally, the $g_1$ and $g_2$ functions can be expressed in conjunction with the luminance $R_i$, $G_i$, $B_i$ and size $S_{Ri}$, $S_{Gi}$, $S_{Bi}$ (i=1, 2, 3) of the original pixels, namely the area $S_{Ri}$', $S_{Gi}$', $S_{Bi}$'(i=1, 2) of the converted pixels, to ensure $\Sigma R_i^* S_{Ri}=\Sigma R_i'^* S_{Ri}'$, $\Sigma G_i^* S_{Gi}=\Sigma G_i'^* S_{Gi}'$, $\Sigma B_i^* S_{Bi}=\Sigma B_i'^* S_{Bi}'$, and the functions are corrected according to the expressed color difference so as to achieve an optimal display effect.

Optionally, the implementation of the above calculation method can also be transformed into YCrCb space or hsv space to perform the luminance and color saturation match, such that the proportioning of YCrCb pixel can be optimized in combination with the sub-pixel W, and the pixels RGB can be re-assigned to achieve the purpose of expressing the original pixel $(RGB)_3$ by R2G2B2W pixels.

A color barrier material that is widely used at present can be used as a color film material. In particular, in order to solve the problem of color difference resulting from addition of white pixels, a wide color gamut photoluminescent color film material, such as quantum dots, can be chosen as the color film material.

Figure 4:
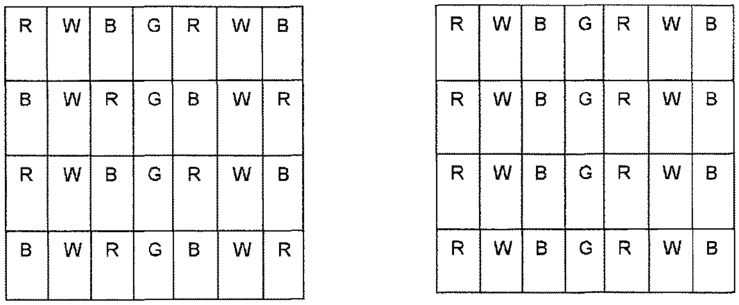
FIG. 4 is a schematic view showing a pixel structural arrangement R2G1B2W2 according to an embodiment.

FIG. 4 is a schematic view showing a pixel structural arrangement R2G1B2W2 according to an embodiment. For instance, "R2G1B2W2" is used in the context to indicate a pixel structural arrangement composed of seven sub-pixels, namely, two red sub-pixels R, one green sub-pixel G, two blue sub-pixels B and two white sub-pixels W. To be specific, as shown in FIG. 4, three pixels can be expressed by two red sub-pixels R, two blue sub-pixels B, one green sub-pixel G and two white sub-pixels W, namely, R2G1B2W2 is used to express three pixels. Optionally, specifically as shown in FIG. 4(A), the pixel arrangement structure can be composed of a repeating unit RWBG RWB+BWRG BWR, wherein RW, BG and RWB are three pixel units that borrow missing sub-pixels from surrounding pixels, and BW, RG and BWR are three pixel units, and the sub-pixel W is shared by the three pixel units.

The pixel arrangement can also assume the form of a repeating unit RWBG RWB+RWBG RWB as shown in FIG. 4(B), wherein RW, BG and RWB are three pixel units that borrow missing sub-pixels from surrounding pixels, and RW, BG and RWB are three pixel units, and the sub-pixel W is shared by the three pixel units.

Other optional pixel arrangement structure can be selected from the group consisting of RGBW RWB+RGBW RWB, RWBW RGB+RWBW RGB, RGBW RWB+BGRW BWR, RWBW RGB+BWRW BGR, RGBW RWB+RWBG RWB, RGBW RWB+RWBG RWB and the like. In the above pixel arrangement, the red sub-pixel R and the blue sub-pixel B are interchangeable in position, and the green sub-pixel G and the white sub-pixel W are interchangeable in position.

All the arrangement structures R2B2G1W2 that satisfy the above requirements fall within the scope of protection of the present application.

Figure 5:
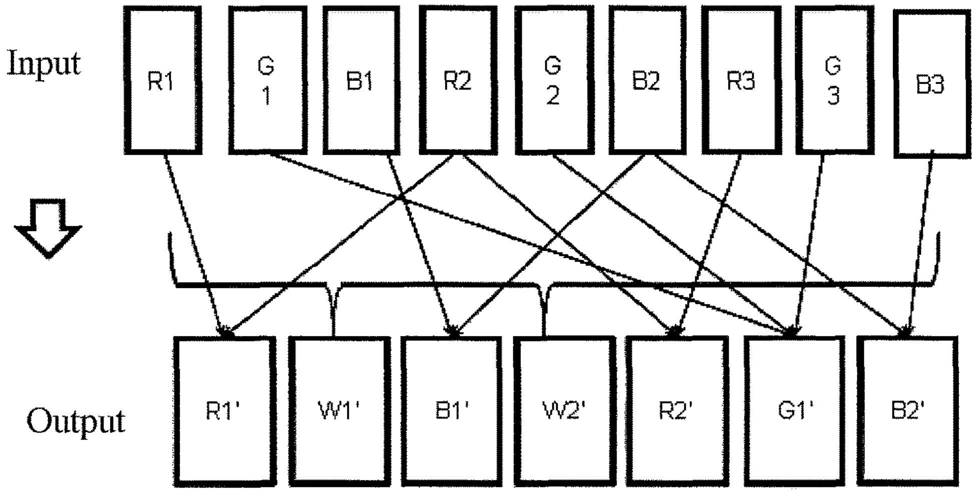
FIG. 5 is a schematic view showing a method for calculating the pixel structural arrangement R2G1B2W2 according to an embodiment.

FIG. 5 is a schematic view showing a method for calculating the pixel structural arrangement R2G1B2W2 according to an embodiment. In regard to the above structure, the basic idea of the calculating method is to express three pixels by two red sub-pixels, one green sub-pixel, two blue sub-pixels and two white sub-pixels (namely, R2G1B2W2), wherein each pixel is composed of sub-pixels of two colors, missing sub-pixel colors are borrowed from the surrounding pixels, and two sub-pixels W are shared by the three pixels to improve the transmittance of the three pixels.

As shown in FIG. 5, the input signals are three original pixels, namely $(RGB)_3$, the sub-pixels W1 ' and W2' are extracted from the original three pixels, the sub-pixels W1', W2' and sub-pixel G together reflect a luminance channel. Meanwhile, two red, green and blue sub-pixels in the actual pixels are used to present a color channel.

Figure 6:
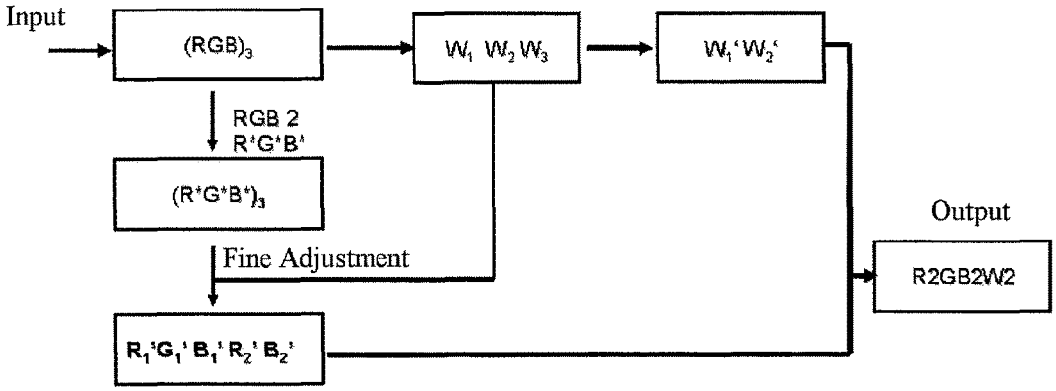
FIG. 6 is a flow block diagram of the method for calculating the pixel structural arrangement R2G1B2W2 according to an embodiment.
Figure 8:
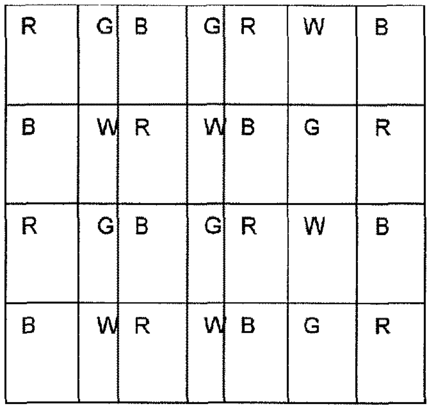
FIGS. 8(A)-8(F) are schematic views showing a pixel structural arrangement $R2G_{1/2}2B2W+R2G1B2W_{1/2}2$ according to an embodiment.
Figure 8:
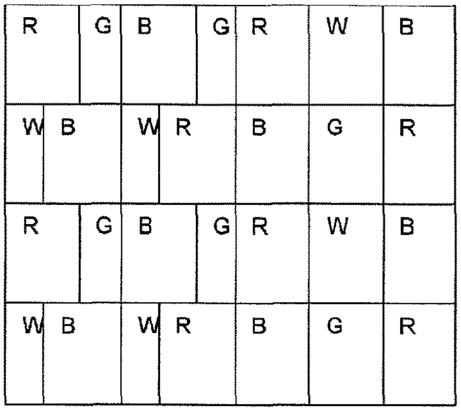
Figure 8:
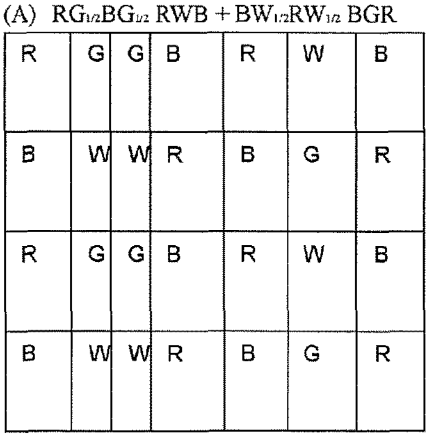
Figure 8:
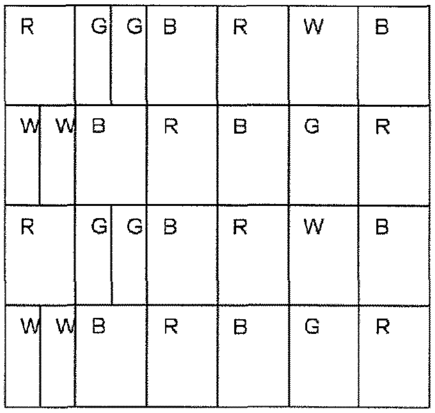
Figure 8:
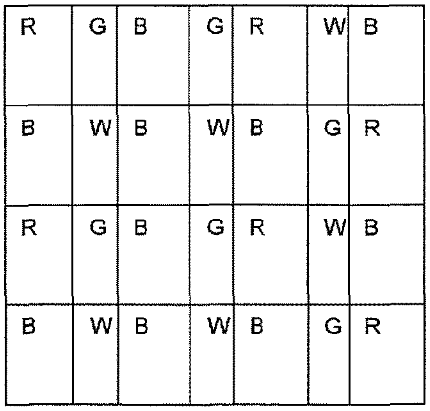
Figure 8:
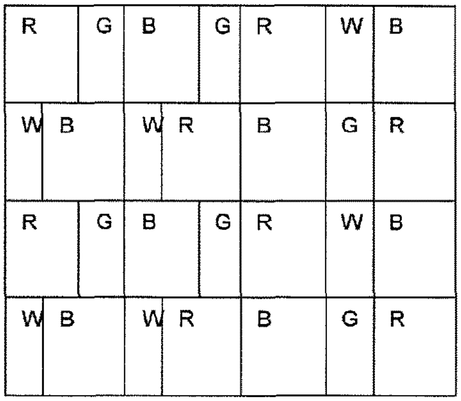

FIG. 6 illustrates the flow of the method for calculating the pixel structural arrangement R2G1B2W2 according to an embodiment as follows:

1) determining the sub-pixels $W_1'$ and $W_2'$, wherein $Y_{1min}$ denotes the minimum value of luminance of $R_1G_1B_1$, $Y_{1max}$ denotes the maximum value of luminance of $R_1G_1B_1$, $Y_{2mia}$ denotes the minimum value of luminance of $R_2G_2B_2$, $Y_{2max}$ denotes the maximum value of luminance of $R_2G_2B_2$, $Y_{3min}$ denotes the minimum value of luminance of $R_3G_3B_3$, and $Y_{3max}$ denotes the maximum value of luminance of $R_3G_3B_3$, $$W_i=f(Y_{i\,min}, Y_{i\,max})$$

$W_1$, $W_2$ and $W_3$ can be expressed by the sub-pixels $W_1'$ and $W_2'$ in the following manner:

$$W_1'=g_1(W_1, W_2)$$

$$W_2'=g_2(W_2, W_3).$$

2) converting the original pixel $R_iG_i\,B_i$ (i=1, 2, 3) into $R_i^*\,G_i^*\,B_i^*$(i=1, 2, 3);

$$R_i^*=R_i(1+\alpha_i)-W_i;$$

$$G_i^*=G_i(1+\alpha_i)-W_i;$$

$$B_i^*=B_i(1+\alpha_i)-W_i;$$

Wherein $\alpha_i$ can be optimally selected according to the pixel color space scaling up, for instance, $\alpha_i$ (i=1,2,3) can be determined by the following equation:

$$\alpha_i=Y_{i\,max}/(Y_{i\,max}-Y_{i\,min})-1$$

Nevertheless, the ways to determine $\alpha_1$, $\alpha_2$ and $\alpha_3$ are not limited to the above-mentioned manner. There can also be other image quality improving manners to guarantee optimal luminance and color gamut after the pixel RGB is converted into the pixel RGBW, and meanwhile the following equation shall be satisfied:

$$R_i^*:G_i^*:B_i^*=(R_i+W_i):(G_i+W_i):(B_i+W_i).$$

3) in $(R_i^*G_i^*B_i^*)_{i=1,2,3}$, expressing $R_1^*$, $R_2^*$, $R_3^*$ by the subpixels $R_1'$, $R_2'$ in the following manner:

$$R_1'=g_1(R_1^*, R_2^*).$$

$$R_2'g_2(R_2^*, R_3^*).$$

Similarly, $G_1^*$, $G_2^*$, $G_3^*$ can be expressed by the subpixel $G_1'$ in the following manner:

$$G_1'=g(G_1^*, G_2^*, G_3^*).$$

Similarly, $B_1^*$, $B_2^*$, $B_3^*$ can be expressed by the subpixels $B_1'$, $B_2'$ in the following manner:

$$B_1'=g_1(B_1^*, B_2^*).$$

$$B_2'=g_2(B_2^*, B_3^*).$$

Wherein, f, g1, g2, g functions perform a pixel binning by means of an average pixel assignment, maximum value, minimum value, linear function or non-linear function and the like. Optionally, in conjunction with the size of the blank region of the pixel and the size of the white sub-pixel, R1', G1', B1', R2', B2', W1', W2' can be determined, and then be simulated and compared with the original data so as to select an optimal proportioning solution, thereby expressing three pixels by R2GB2W2.

Optionally, the $g_1$ and $g_2$ functions can be expressed in conjunction with the luminance $R_i$、$G_i$、$B_i$ and size $S_{Ri}$, $S_{Gi}$, $S_{Bi}$(=1, 2, 3) of the original pixels, namely the area $S_{Ri}'$, $S_{Gi}'$, $S_{Bi}'$(i=1, 2) of the converted pixels, to ensure $\Sigma R_i'^*S_{Ri}=\Sigma R_i'^*S_{Ri}'$, $\Sigma G_i^*S_{Gi}=\Sigma G_i'^*S_{Gi}'$, $\Sigma B_i^*S_{Bi}=\Sigma B_i'^*S_{Bi}'$, and the functions are corrected according to the expressed color difference, so as to achieve an optimal display effect.

Optionally, the implementation of the above calculation method can also be transformed into YCrCb space or hsv space to perform the luminance and color saturation match, such that the proportioning of the YCrCb pixel can be optimized in combination with the sub-pixel W, the RGB pixels can be re-assigned to achieve the purpose of expressing the original pixel $(RGB)_3$ by R2GB2W2 pixels.

As to the TFT-LCD display technology, a color barrier material that is widely used at present can be used as a color film material. In order to solve the problem of potential color difference resulting from addition of white pixels, a wide color gamut photoluminescent color film material, such as quantum dots, can be chosen as the color film material.

In view of the pixel arrangement structure R2G2B2W+R2G1B2W2 according to the above embodiment, FIGS. 7(A)-7(D) illustrate schematic views showing a pixel structural arrangement R2G2B2W+R2G1B2W2 according to an embodiment. For instance, FIG. 7(A) shows a pixel structural arrangement RGBG RWB+BWRW BGR; FIG. 7 (B) shows a pixel structural arrangement RGBG RWB+WBWR BGR; FIG. 7 (C) shows a pixel structural arrangement RGBG RWB+RWBW RGB; and FIG. 7 (D) shows a pixel structural arrangement RGBW RGB+BWRG BWR. Optionally, the pixel structural arrangement may consist of any combination of the arrangement R2G2B2W and the arrangement R2G1B2W2. The pixel rendering method can be combined with the arranging method described by the foregoing embodiments.

FIGS. 8(A)-8(F) are schematic views showing a pixel arrangement structure $R2G_{1/2}2B2W+R2G1B2W_{1/2}2$ according to an embodiment, wherein $G_{1/2}$ or $W_{1/2}$ indicates that the area of the green or white sub-pixel is a half of the area of any other sub-pixel. To be specific, as shown in FIG. 8, if the number of the sub-pixels G in the repeating unit is 2 or the number of the sub-pixels W in the repeating unit is 2, the area thereof may be ½ of that of any other sub-pixel, that is, the pixel arrangement consists of $R2G_{1/2}2B2W+R2G1B2W_{1/2}2$ to solve the problem of overhigh luminance of white pixels.

Optionally, as shown in FIG. 8(A), the pixel structure consists of $RG_{1/2}BG_{1/2}$ $RWB+BW_{1/2}RW_{1/2}$ BGR. For this structure, the pixel rendering method may be that the $RG_{1/2}$ pixel borrows the sub-pixels B from surrounding adjacent pixels (such as, $BG_{1/2}$ pixels), the RWB pixel borrows the sub-pixel $G_{1/2}$ from surrounding adjacent pixels (such as $RG_{1/2}$, $BG_{1/2}$ pixels), and $RW_{1/2}$ $BW_{1/2}$ pixels borrow the sub-pixels G from adjacent pixels (such as, RGB pixels). The pixel rendering method is identical with that of the foregoing embodiments, and the algorithm may be slightly adjusted according to different sub-pixel areas.

Optionally, the pixel arrangement structure, as shown in FIG. 8(B), consists of a repeating unit $RG_{1/2}BG_{1/2}$ RWB+ $W_{1/2}BW_{1/2}R$ BGR, wherein in the sub-pixels $RG_{1/2}$, $BG_{1/2}$, $W_{1/2}B$, $W_{1/2}R$, the areas of the sub-pixel $G_{1/2}$ and the sub-pixel $W_{1/2}$ are respectively ½ of that of any other sub-pixel. Different from the embodiment shown in FIG. 8(A), in order to avoid jagged distortion of a high-definition image, and reproduce color more accurately and provide a more uniform image, the sub-pixel W and the sub-pixel B as well as the sub-pixel W and the sub-pixel R in the embodiment of FIG. 8(A) are interchangable in position.

Optionally, as shown in FIG. 8(C), the pixel structural arrangement is composed of a repeating unit $RG_{1/2}G_{1/2}B$ RWB+$BW_{1/2}W_{1/2}R$ BGR, wherein the sub-pixels G, W of $RG_{1/2}$, $G_{1/2}B$, $BW_{1/2}$ and $W_{1/2}R$ are ½ of other sub-pixels.

Optionally, as shown in FIG. 8(D), the pixel structural arrangement is composed of a repeating unit $RG_{1/2}$ $G_{1/2}B$ RWB+$W_{1/2}W_{1/2}BR$ BGR, wherein the sub-pixels G, W of $RG_{1/2}$, $G_{1/2}B$, $W_{1/2}B$ and $W_{1/2}R$ are ½ of other sub-pixels.

Optionally, as shown in FIG. 8(E), the pixel structural arrangement is composed of a repeating unit $RG_{1/2}BG_{1/2}$ $RW_{1/2}B$+$BW_{1/2}RW_{1/2}$ $BG_{1/2}R$, wherein $RG_{1/2}$, $BG_{1/2}$, $RW_{1/2}B$, $BW_{1/2}$, $RW_{1/2}$ and $BG_{1/2}R$ respectively represent a pixel, and the area of all the sub-pixels G and W is ½ of that of other sub-pixels.

Optionally, as shown in FIG. 8(F), the pixel structural arrangement is composed of a repeating unit $RG_{1/2}$ $BG_{1/2}$ $RW_{1/2}B$+$W_{1/2}BW_{1/2}R$ $BG_{1/2}R$, wherein $RG_{1/2}$, $BG_{1/2}$, $RW_{1/2}B$, $W_{1/2}B$, $W_{1/2}R$ and $BG_{1/2}R$ respectively represent a pixel, and the area of all the sub-pixels G and W is ½ of that of other sub-pixels.

In regard to the above structure, if, in the pixel rendering method, a pixel lacks any sub-pixel R, G or B, it may borrow the sub-pixel from surrounding pixels. For instance, in FIG. 8(A), $RG_{1/2}$ pixel can borrow the sub-pixel B from the surrounding adjacent pixel (such as $BG_{1/2}$ pixel), $RW_{1/2}B$ pixel can borrow the $G_{1/2}$ sub-pixel from the surrounding adjacent pixel (such as $RG_{1/2}$ $BG_{1/2}$ pixel), and $RW_{1/2}$ $BW_{1/2}$ pixels can borrow $G_{1/2}$ sub-pixel from the surrounding adjacent pixel (such as $RG_{1/2}B$).

As compared with the foregoing embodiment, color assignment and ratio in the present embodiment may be different because the area and color assignment of sub-pixels of the present embodiment are different from those of the foregoing embodiment.

As to the TFT-LCD display technology, a color barrier material that is widely used at present can be used as a color film material. In order to solve the problem of potential color difference resulting from addition of white pixels, a wide color gamut photoluminescent color film material, such as quantum dots, can be chosen as the color film material.

The present invention is not limited to TFT-LCD technology, and can also be applicable to AMOLED display technology.

The terms used herein are merely to describe particular embodiments, rather than limiting the invention. As used herein, a singular form may also include the plural forms as expected, unless otherwise specified. It will be further understood that the terms "comprising", "including", "consisting of", "composed of" and their derivatives when used indicate the presence of the features, entirety, operations, steps, elements, and/or components, but do not exclude the presence of one or more other features, entirety, steps, operations, elements, components and/or combinations thereof.

Although reference has been made to exemplary embodiments of the present disclosure to disclose and describe the embodiments specifically, those skilled in the art will appreciate that various changes in form and details can be made without departing from the spirit and scope of the present invention as defined in the appended claims. Accordingly, the scope of the present invention is not defined by the detailed description of the application, but defined by the appended claims.

The invention claimed is:

1. A method for applying sub-pixel converting algorithm on the display of a display device, comprising the steps of:

a. extracting, by the display device, a sub-pixel W' from three input original pixels $(RGB)_3$ of the display, wherein $W'=f(Y_{1\ min}, Y_{1\ max}, Y_{2\ min}, Y_{2\ max}, Y_{3\ min}, Y_{3\ max})$, $Y_{1\ min}$ and $Y_{1\ max}$ respectively denote the minimum value and maximum value of luminance of $R_1G_1B_1$, $Y_{2\ min}$ and $Y_{2\ max}$ respectively denote the minimum value and maximum value of luminance of $R_2G_2B_2$, and $Y_{3\ min}$ and $Y_{3\ max}$ respectively denote the minimum value and maximum value of luminance of $R_3G_3B_3$;

b. removing, by the display device, the sub-pixel W' from the original pixel $R_i$ $G_i$ $B_i$ (i=1, 2, 3) to obtain $R_i{}^*G_i{}^*B_i{}^*$(i=1, 2, 3);

c. calculating sub-pixels $R_1'$ and $R_2'$ by using $R_1{}^*$, $R_2{}^*$, $R^{3*}$ in $(R_i{}^*G_i{}^*B_i{}^*)_{i=1,2,3}$, calculating a sub-pixel $G_1'$ and $G_2'$ by using $G_1{}^*$, $G_2{}^*$, $G_3{}^*$, and calculating sub-pixels $B_1'$ and $B_2'$ by using $B_1{}^*$, $B_2{}^*$, $B_3{}^*$, wherein $$R_1'=g_1(R_1^*, R_2^*),\ R_2'=g_2(R_2^*, R_3^*);$$

$$G_1'=g_1(G_1^*, G_2^*),\ G_2'=g_2(G_2^*, G_3^*);$$

$$B_1'=g_1(B_1^*, B_2^*),\ B_2'=g_2(B_2^*, B_3^*);\ \text{and}$$

rendering sub-pixels $R_1'$, $R_2'$, $G_1'$, $G_2'$, $B_1'$, $B_2'$, W' and on the display.

2. The method according to claim 1, wherein the step b comprises:

$$R_i^*=R_i(1+\alpha_i)-W';$$

$$G_i^*=G_i(1+\alpha_i)-W';$$

$$B_i^*=B_i(1+\alpha_i)-W';$$

wherein $\alpha_i$ is optimally selected according to the pixel color space scaling up, or using other image quality improving manners to guarantee optimal luminance and color gamut after the pixel RGB is converted into the pixel RGBW, and meanwhile the following equation shall be satisfied:

$$R_i^*: G_i^*: B_i^*=(R_i+W') : (G_i+W') : (B_i+W').$$

3. A method for applying sub-pixel converting algorithm on the display of a display device, comprising the steps of:

a. extracting, by the display device, sub-pixels $W_1'$ and $W_2'$ from three input original pixels $(RGB)_3$ of the display, wherein $W_1'=g_1(W_1, W_2)$; $W_2'=g_2(W_2, W_3)$; and wherein $W_i=f(Y_{i\ min}, Y_{i\ max})$, $Y_{1\ min}$ and $Y_{1\ max}$ respectively denote the minimum value and maximum value of luminance of $R_1G_1B_1$, $Y_{2\ min}$ and $Y_{2\ max}$ respectively denote the minimum value and maximum value of luminance of $R_2G_2B_2$, and $Y_{3\ min}$ and $Y_{3\ max}$ respectively denote the minimum value and maximum value of luminance of $R_3G_3B_3$;

b. removing, by the display device, the sub-pixel W' from the original pixel $R_iG_iB_i$(i=1, 2, 3) to obtain $R_i{*}G_i{*}B_i{*}$ (i=1, 2, 3);

c. calculating sub-pixels and $R_1'$ and $R_2'$ by using $R_1{*}$, $R_2{*}$, $R_3{*}$ in $(R_i{*}G_i{*}B_i{*})_{i=1,2,3}$, calculating a sub-pixel $G_1'$ by using $G_1{*}$, $G_2{*}$, $G_3{*}$, and calculating sub-pixels $B_1'$ and $B_2'$ by using $B_1{*}$, $B_2{*}$, $B_3{*}$, wherein $$R_1'=g_1(R_1{*}, R_2{*}),\ R_2'=g_2(R_2{*}, R_3{*});$$

$$G_1'=g(G_1{*}, G_2{*}, G_3{*});$$

$$B_1'=g_1(B_1{*}, B_2{*});\ B_2'=g_2(B_2{*}, B_3{*});\ \text{and}$$

rendering sub-pixels $R_1'$, $R_2'$, $G_1'$, $B_1'$, $B_2'$, $W_1'$ and $W_2'$ on the display.

4. The method according to claim 3, wherein the step b comprises:

$$R_i{*}=R_i(1+\alpha_i)-W_i;$$

$$G_i{*}=G_i(1+\alpha_i)-W_i;$$

$$B_i=B_i(1+\alpha_i)-W_i;$$

wherein $\alpha_i$ is optimally selected according to the pixel color space scaling up, or using other image quality improving manners to guarantee optimal luminance and color gamut after the pixel RGB is converted into the pixel RGBW, and meanwhile the following equation shall be satisfied:

$$R_i{*}:\ G_i{*}:\ B_i{*}=(R_i+W_i):(G_i+W_i):(B_i+W_i).$$

5. The method according to claim 1, wherein f, g1, g2 functions perform a pixel binning by means of an average pixel assignment, maximum value, minimum value, linear function or non-linear function.

6. The method according to claim 1, wherein the sub-pixels $R_1'$, $R_2'$, $G_1'$, $G_2'$, $B_1'$, $B_2'$ are determined in conjunction with the luminance $R_i$, $G_i$, $B_i$, and size $S_{Ri}$, $S_{Gi}$,$S_{Bi}$(i=1, 2, 3) of the original pixels, and the area $S_{Ri}'$, $S_{Gi}'$, $S_{Bi}'$(i =1, 2) of the converted pixels, to ensure $\Sigma R_i{*}S_{Ri}=\Sigma R_i'{*}S_{Ri}'$, $\Sigma G_i{*}S_{Gi}=\Sigma G_i'{*}S_{Gi}'$, $\Sigma B_i{*}S_{Bi}=\Sigma B_i'{*}S_{Bi}'$, and the functions are corrected according to the expressed color difference.

* * * * *